(12) United States Patent
Kim

(10) Patent No.: US 7,546,986 B2
(45) Date of Patent: Jun. 16, 2009

(54) PIPE HANGER

(75) Inventor: Tae Sik Kim, Hwaseong (KR)

(73) Assignee: B&I Co. Ltd., Seoul (KR)

( * ) Notice: Subject to any disclaimer, the term of this patent is extended or adjusted under 35 U.S.C. 154(b) by 350 days.

(21) Appl. No.: 11/470,780

(22) Filed: Sep. 7, 2006

(65) Prior Publication Data

US 2007/0272806 A1    Nov. 29, 2007

(30) Foreign Application Priority Data

May 19, 2006    (KR)    ............... 10-2006-0045157

(51) Int. Cl.
*F16L 3/00*    (2006.01)
(52) U.S. Cl. ............... 248/62; 248/67.5; 248/74.1; 248/68.1; 248/73
(58) Field of Classification Search ............... 248/62, 248/74.1, 68.1, 73; 292/256, 256.6, 256.65; 285/411, 366
See application file for complete search history.

(56) References Cited

U.S. PATENT DOCUMENTS

| | | | | |
|---|---|---|---|---|
| 2,365,710 | A | * | 12/1944 | Loepsinger ............... 248/583 |
| 3,048,359 | A | * | 8/1962 | Kohler ............... 248/543 |
| 5,009,386 | A | * | 4/1991 | Berger et al. ............... 248/613 |
| 6,779,762 | B2 | * | 8/2004 | Shibuya ............... 248/62 |

FOREIGN PATENT DOCUMENTS

| | | |
|---|---|---|
| KR | 20-1990-0014681 | 8/1990 |
| KR | 20-1994-0027123 | 12/1994 |
| KR | 20-1995-0027946 | 10/1995 |
| KR | 20-1997-0043463 | 7/1997 |
| KR | 20-1998-0003991 | 3/1998 |
| KR | 20-0184219 | 6/2000 |
| KR | 20-0190184 | 7/2000 |
| KR | 20-0197233 | 9/2000 |
| KR | 20-0414911 | 4/2006 |

OTHER PUBLICATIONS

English Language Abstract of KR 20-1990-0014681.
English Language Abstract of KR 20-1994-0027123.

(Continued)

*Primary Examiner*—J. Allen Shriver, II
*Assistant Examiner*—Alaeddin Mohseni
(74) *Attorney, Agent, or Firm*—John K. Park; Park Law Firm

(57) ABSTRACT

A pipe hanger hooks or unhooks lower ends of semicircular bands divided left and right by means of a hooking means, mounts mounting plates integrally formed at the lower end of a supporting bracket to mounting plates integrally formed at upper ends of the semicircular bands, provides a resiliently biasing means in the supporting bracket to resiliently bias a nut block in an upward direction, couples a locking plate or rod into the mounting plates of the other-side semicircular band and the supporting bracket, mounts a locking cap and a locking guide to the mounting plate of the one-side semicircular band, and forms a hook of the lower end of the other-side semicircular band so as to extend beyond the vertical center line of an inner space defined by the semicircular bands. Thereby, the resiliently biasing means is provided in the supporting bracket to thus retain block.

4 Claims, 9 Drawing Sheets

OTHER PUBLICATIONS

English Language Abstract of KR 20-1995-0027946.
English Language Abstract of KR 20-1997-0043463.
English Language Abstract of KR 20-1998-0003991.
English Language Abstract of KR 20-0190184.
English Language Abstract of KR 20-0197233.
English Language Abstract of KR 20-0184219.
English Language Abstract of KR 20-0414911.

* cited by examiner

[FIG.1]
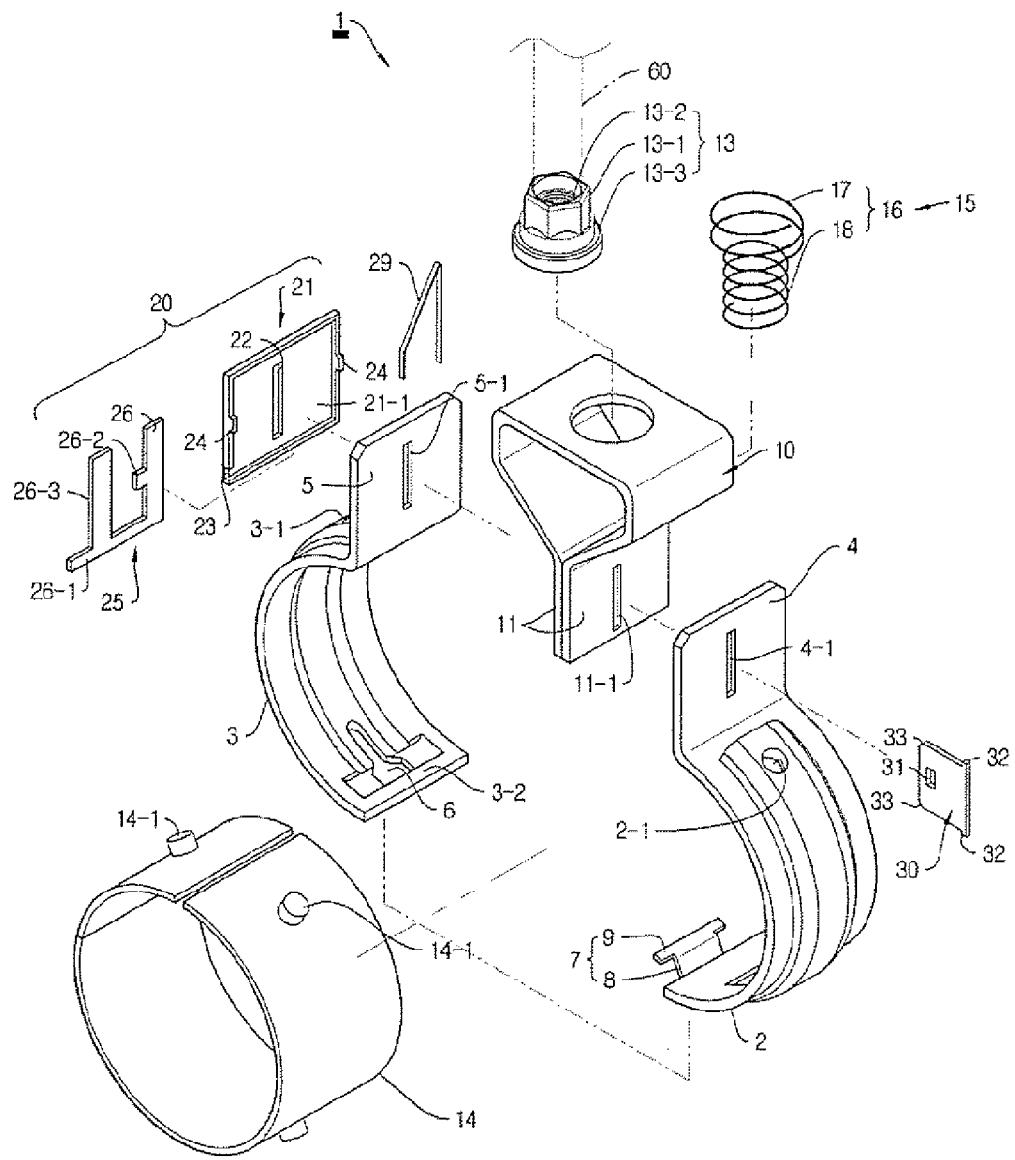

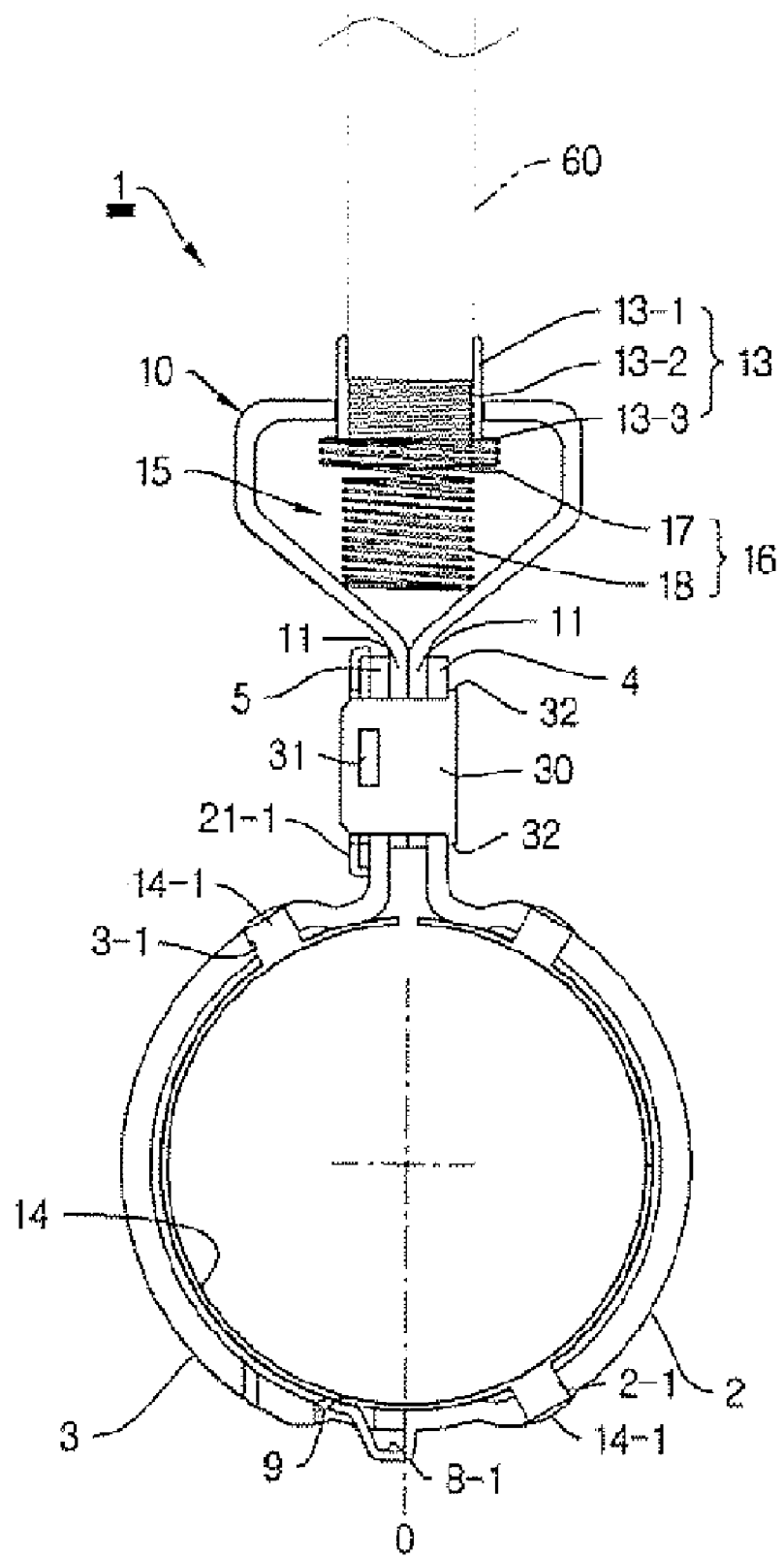
[FIG.2]

[FIG.3A]
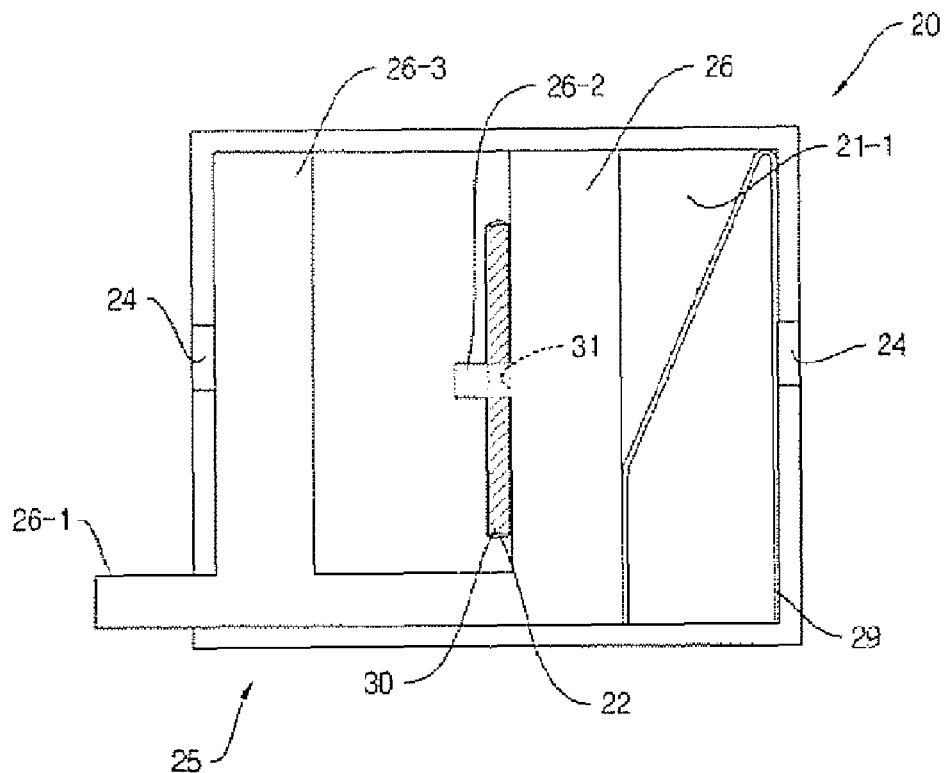
[FIG.3B]
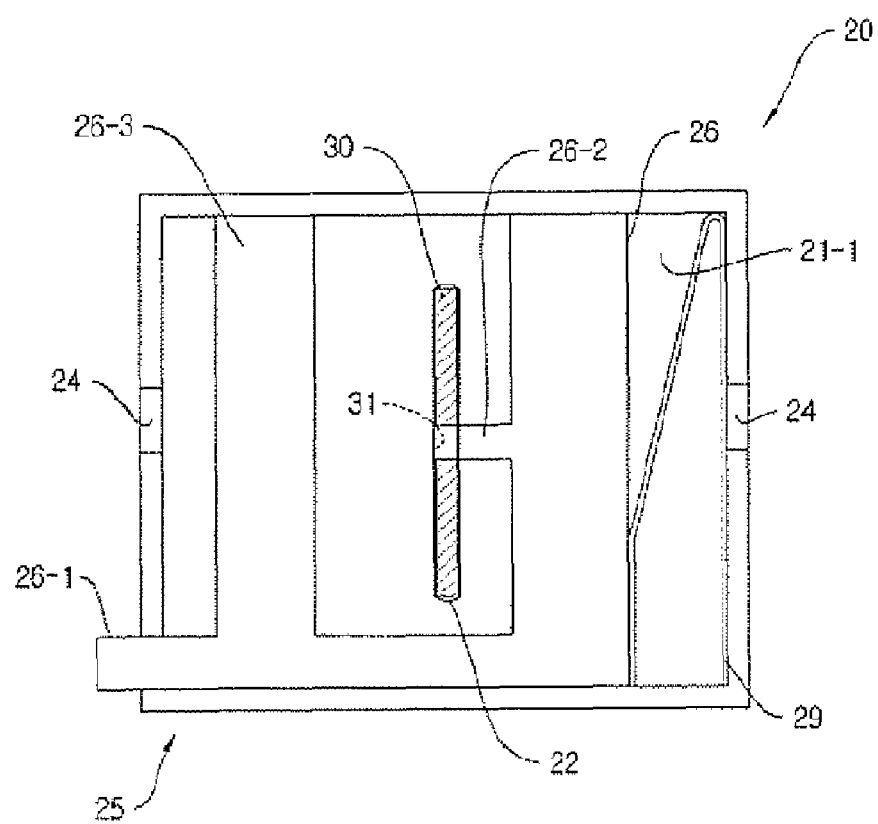

[FIG.4A]
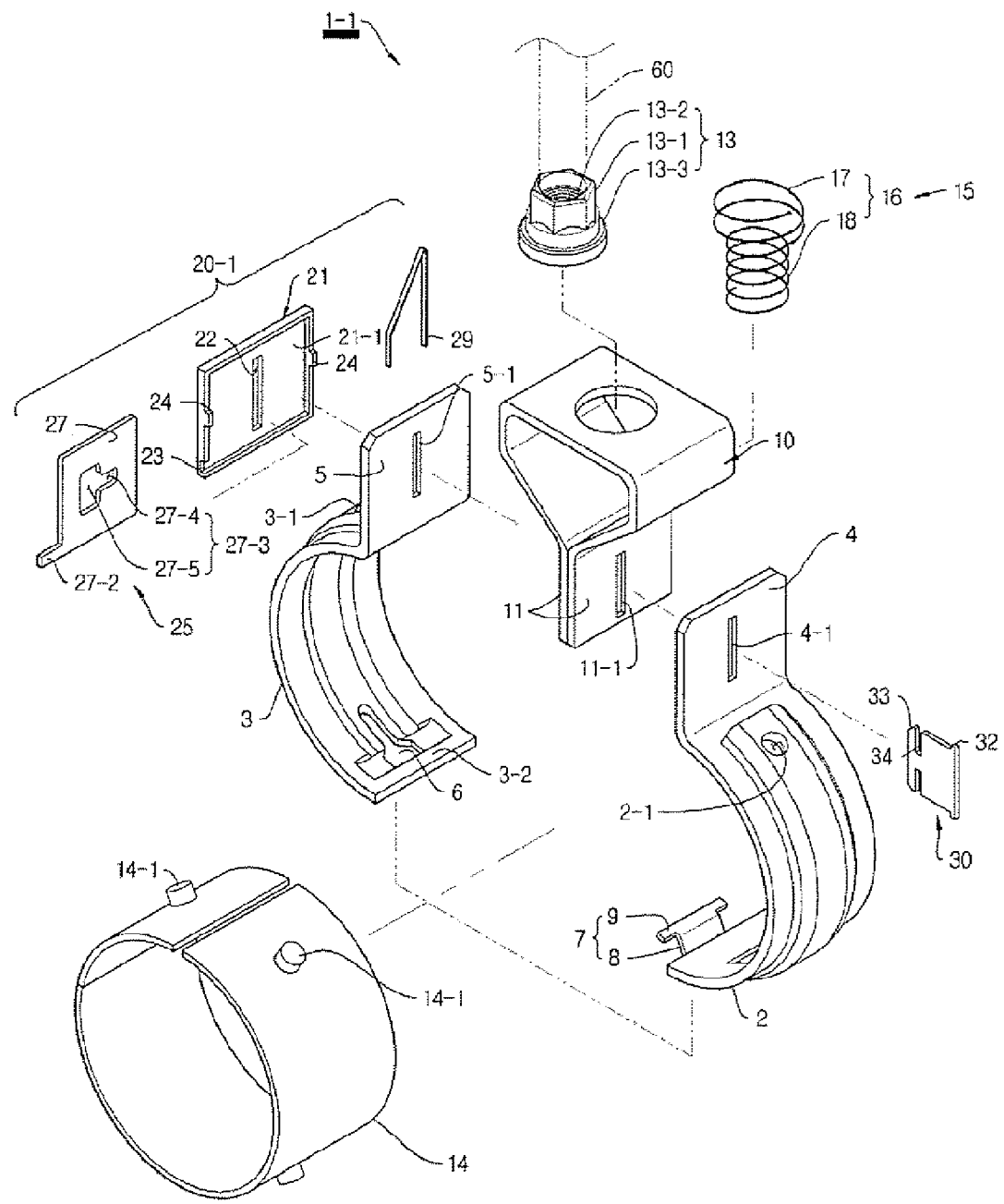

[FIG. 4B]
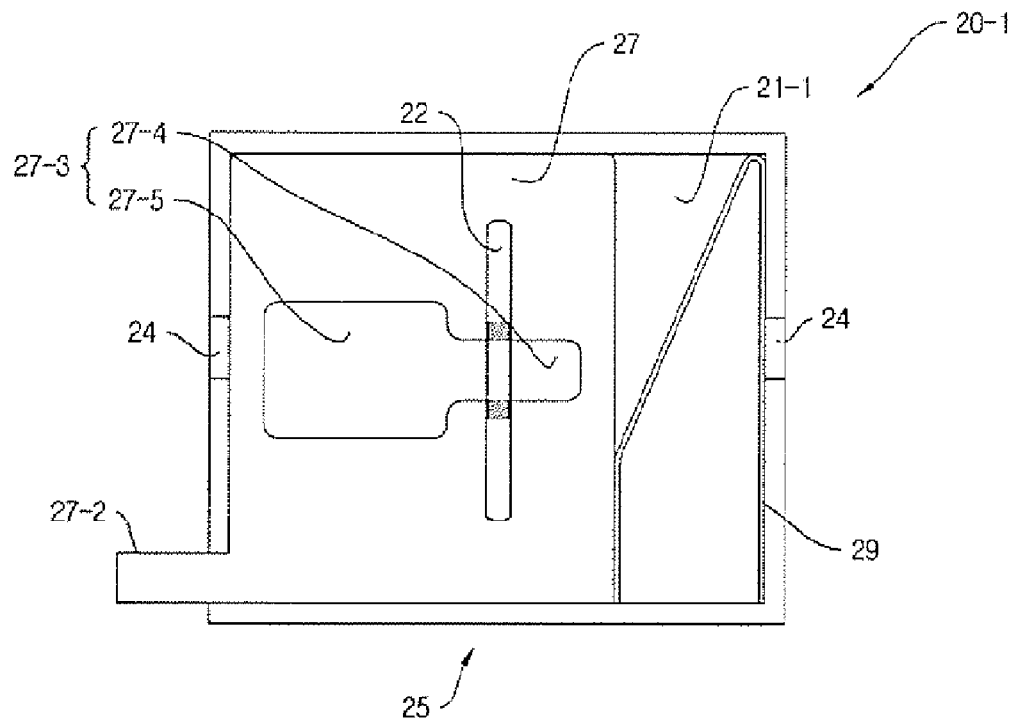
[FIG. 4C]
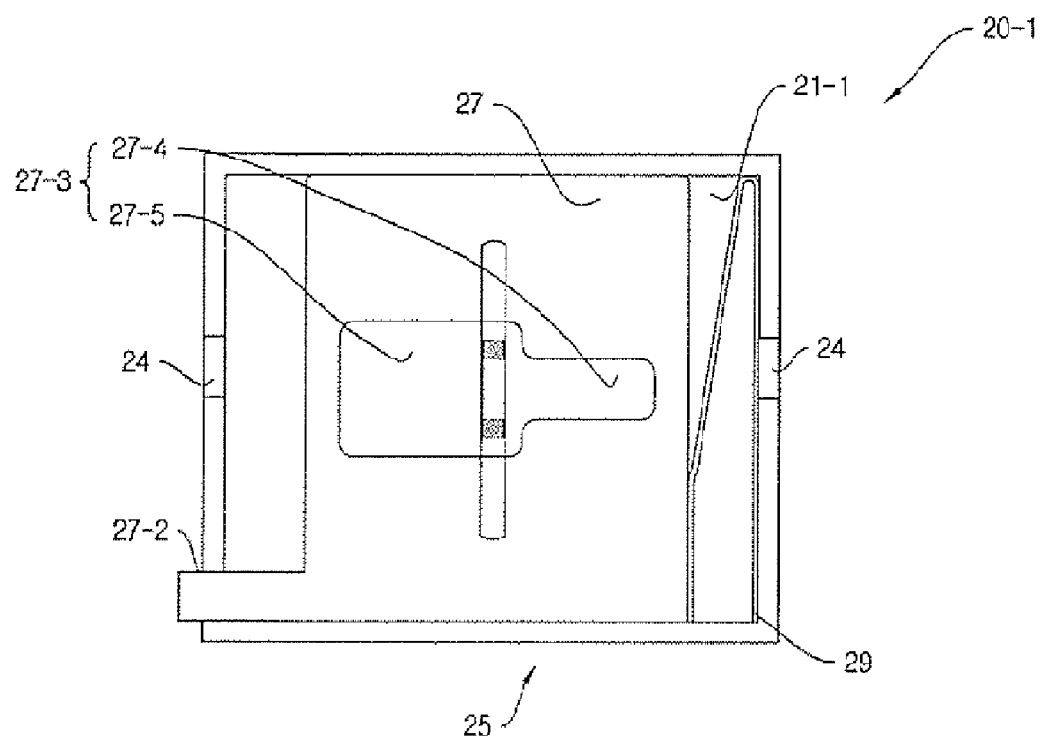

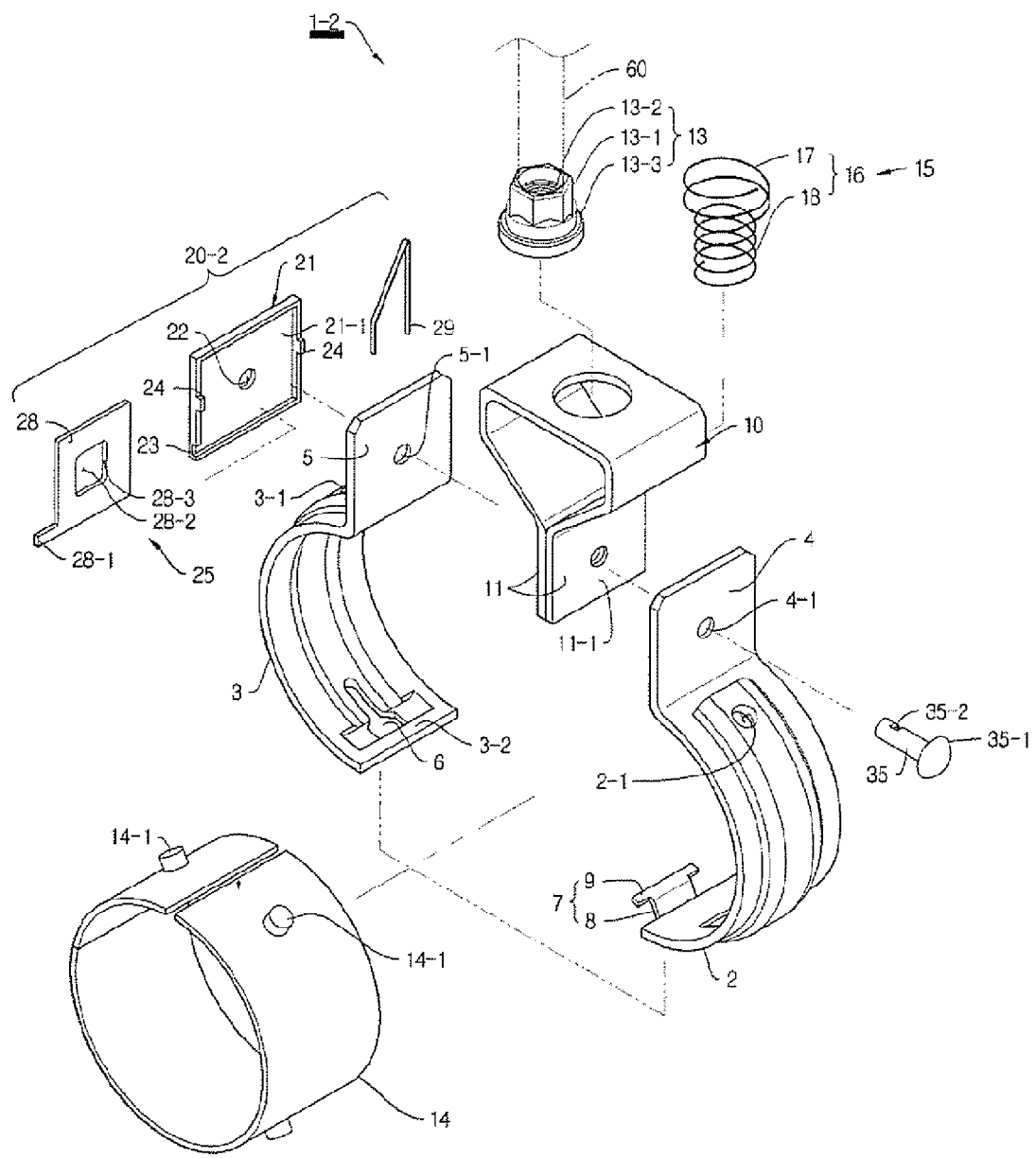
[FIG. 5A]

[FIG.5B]
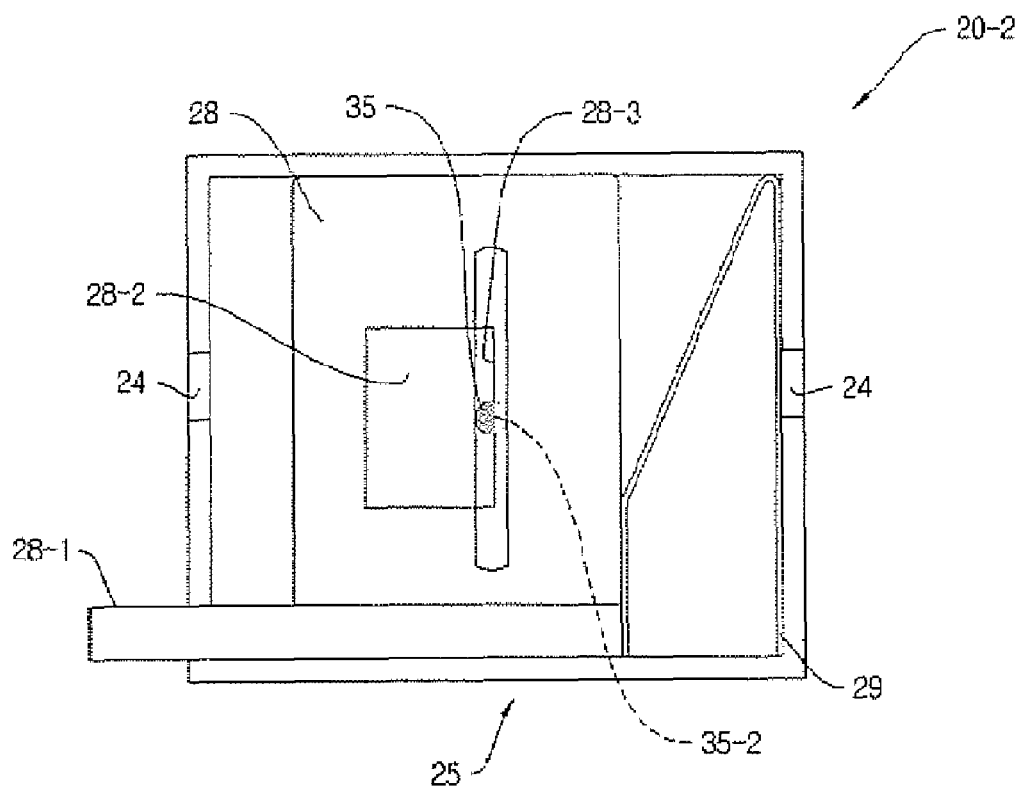
[FIG.5C]
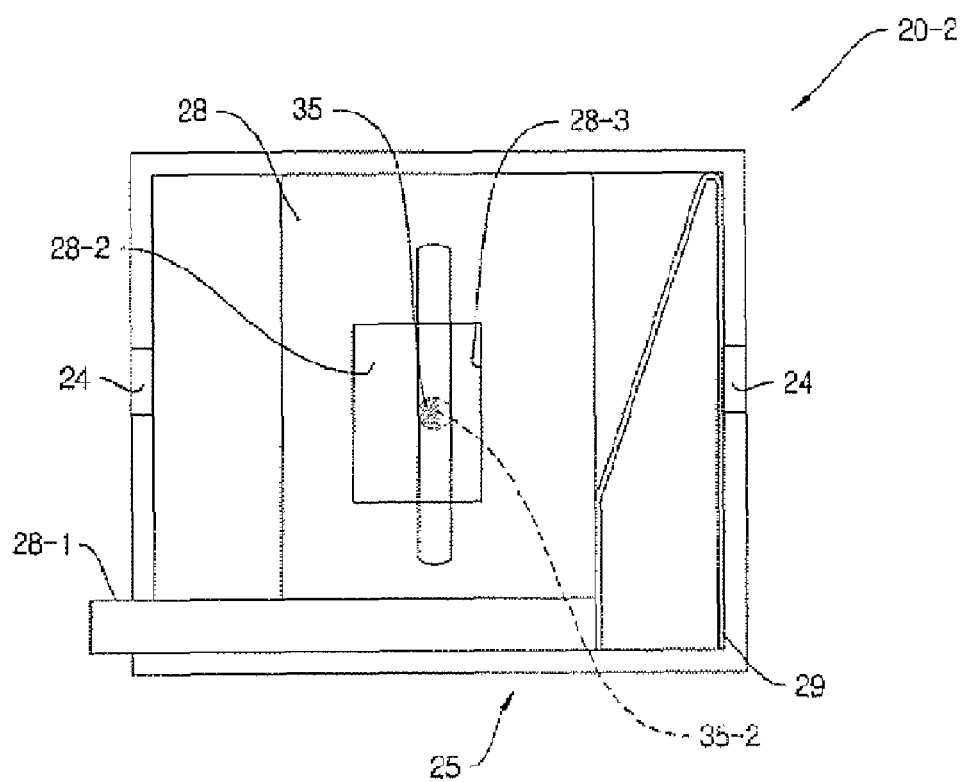

[FIG.6]
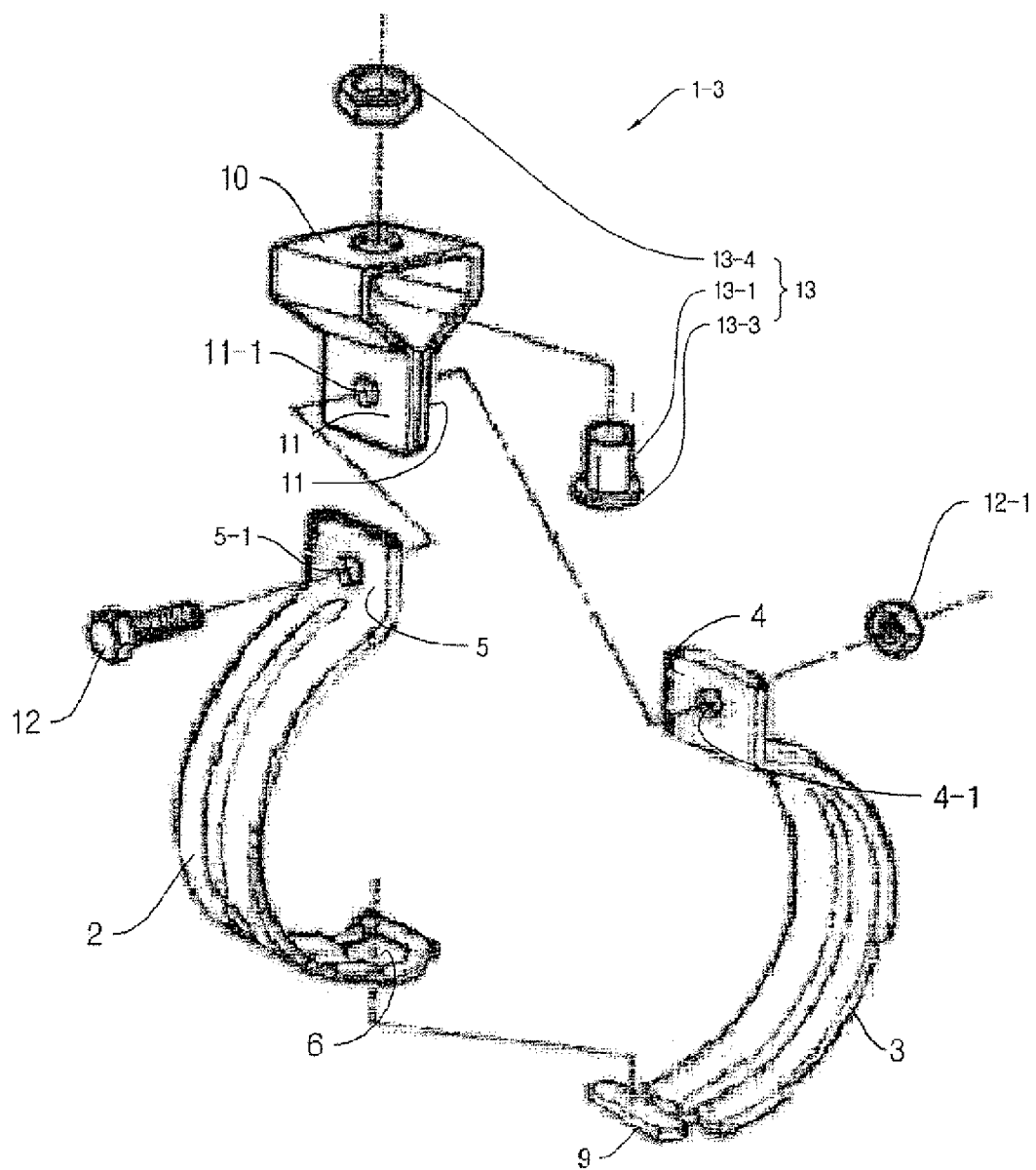

[FIG.7]
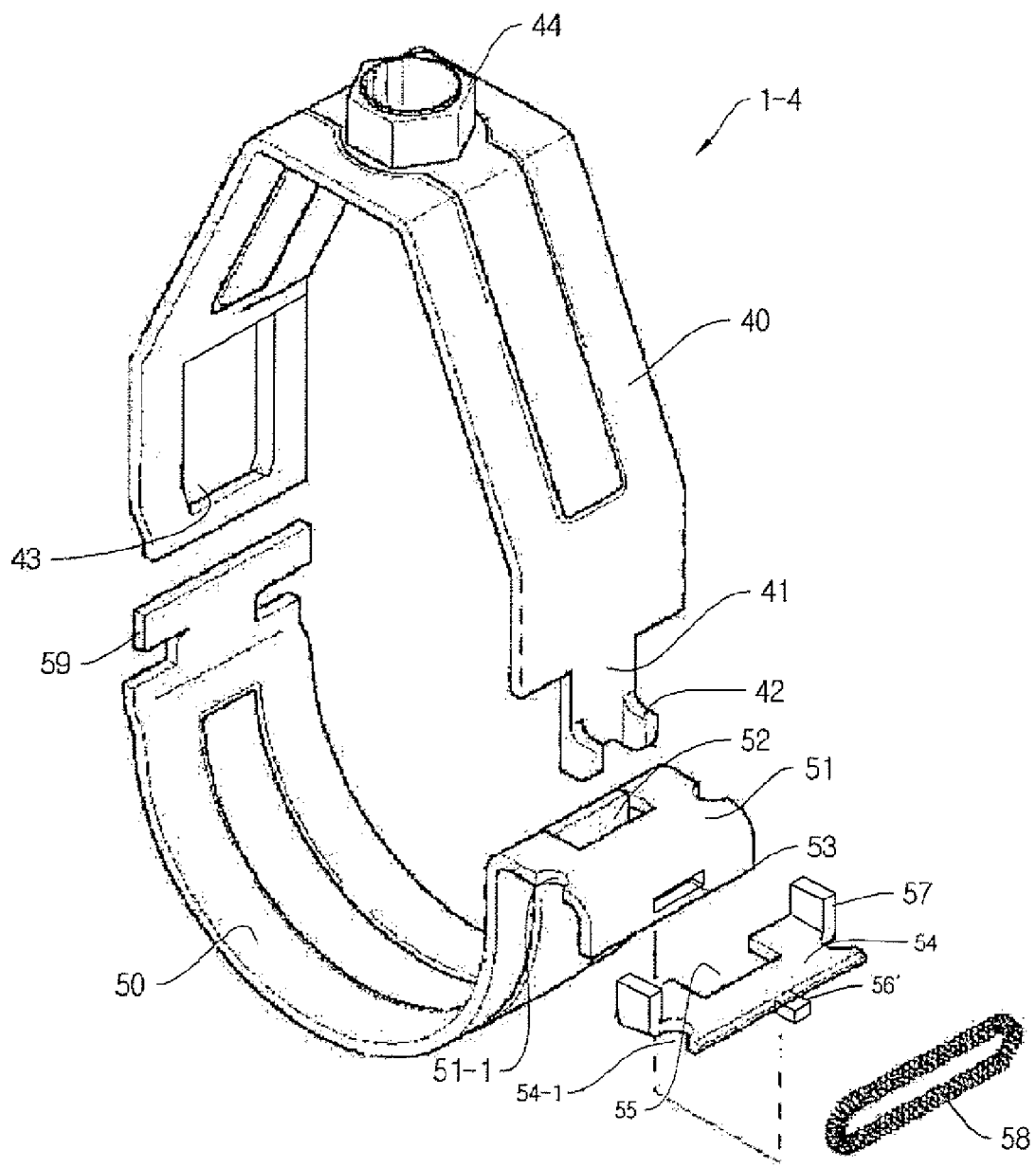

PIPE HANGER

BACKGROUND OF THE INVENTION

1. Field of the Invention

The present invention relates, in general, to a pipe hanger used to install a pipe to the ceiling or wall of a building. More particularly, the present invention is directed to provide a pipe hanger, in which lower ends of semicircular bands divided left and right are hooked and unhooked by a hooking means, and mounting plates integrally formed at the lower end of a supporting bracket are mounted to the mounting plates integrally formed at upper ends of the semicircular bands, thereby obtaining a damping effect on vibration or external impacts by providing a resiliently biasing means to the supporting bracket, readily locking or unlocking a locking plate, inserted into the mounting plate of each semicircular band and the mounting plates of the supporting bracket, to or from a locking assembly, and easily supporting the installed pipe by forming a hook of the lower end of the other-side semicircular band to expend beyond the vertical center line of the inner space defined by the semicircular bands.

2. Description of the Prior Art

Typically, when various types of pipes used for a water supply pipe, a sewer pipe, an indoor pipe, and the like are installed on an installation plane such as the ceiling of a building, supporting reds are fixed to the installation plane at regular intervals, and a pipe hanger is mounted to a lower end of each supporting rod. Then, the pipe is installed such that it is retained by the pipe hanger.

FIGS. 6 and 7 illustrate conventional pipe hangers 1-3 and 1-4, each of which is mounted to a support rod when a pipe is installed as described above.

The conventional pipe hanger 1-3 illustrated in FIG. 6 is disclosed in Korean Utility Model Publication Nos. 20-1990-0014681, 20-1994-0027123, 20-1995-0027946, 20-1997-0043463, and 20-1998-0003991, and Registration Nos. 20-190184 and 20-197233.

The pipe hanger has a pair of semicircular bands 2 and 3. The semicircular bands 2 and 3 are integrally formed with mounting plates 4 and 5, through which mounting holes 4-1 and 5-1 are bored, on upper ends thereof, and formed with a hooked claw 9 and a hooking hole 6 on lower ends thereof. The mounting plates 4 and 5 of the semicircular bands 2 and 3 are fastened to mounting plates 11, which are formed on opposite lower ends of a supporting bracket 10 and through which a mounting hole 11-1 is bored, by a fastening means such as a bolt 12 and nut 12-1. A supporting rod is fastened to a nut block 13 coupled on an upper portion of the supporting bracket 10.

When a pipe is installed using the conventional pipe hanger 1-3 constructed in this way, the semicircular band 3 is separated from the other semicircular band 2 by unfastening the nut 12-1 from the bolt 12, which is fastened to the mounting plates 4 and 5 of the semicircular bands 2 and 3 and the mounting plate 11 of the supporting bracket 10. The pipe is inserted between the stationary semicircular band 2 and the free semicircular band 3. In this state, a hooked claw 9 is hooked on a hooking hole 6 while the pipe is supported by hand so as not to escape from the stationary band. Then, the bolt 12 is inserted into the mounting hole 5-1 bored through the mounting plate 5. In this state, the nut 12-1 is screwed on an end of the bolt 12 protruding outwardly through the mounting plate 5. For this reason, the installation is very complicated. Further, because the semicircular band 2 has the shape of a complete semicircle having one end located on a vertical line, the semicircular band 3 should be fastened while the pipe placed on an inner surface of the semicircular band 3 is supported so as not to fall down. Hence, the pipe cannot be readily installed.

The nut 12-1 screwed onto the bolt 12 via the mounting plates 4, 5 and 11 becomes loose by means of vibration, thereby weakening clamping force between the nut and bolt with respect to the pipe.

FIG. 7 illustrates another conventional pipe hanger 1-4, which is disclosed in Korean Utility Model, Registration Nos. 20-0184219 and 20-0414911.

The conventional pipe hanger 1-4 is adapted to couple and decouple a semicircular lower band 50 to and from an angled upper band 40.

Among diametrically opposite ends of the upper band 40, one end has a hooking hole 43 punched out thereof, and the other end is integrally formed with an extension 41, from which hooked claws 42 protrude outwardly. Among diametrically opposite ends of the semicircular lower band 50, one end is formed with a hooked piece 59 so as to be hooked into and unhooked from the hooking hole 43, and the other end has vertical and horizontal fitting holes 52 and 53 punched out thereof. The other end of the semicircular lower band 50 is integrally formed with a C-shaped flange 51, which is provided with spring retainer recesses 51-1 on opposite ends thereof, and in an enclosed lower space of which a retaining piece 54 is disposed so as to retain the hocked claws 42 of the upper band 40 which are inserted (or coupled) through the vertical fitting hole 52. The retaining piece 54 is provided with a fitting recess 55 and a fitted nose 56 at the rear and front thereof respectively, and with spring retainer recesses 54-1 and support protrusions 57 at the front and rear of opposite longitudinal ends thereof. Accordingly, the retaining piece 54 can be coupled and decoupled to and from the C-shaped flange 51 by fitting an annular coil spring 58 into the spring retainer recesses 51-1 and 54-1.

However, in order to install the pipe, the lower band 50 is decoupled from the upper band 40. Then, the decoupled lower band 50 is contacted with an outer surface of the pipe, and the hooked piece 59 is hooked into the hooking hole 43. The C-shaped flange 51 of the lower band 50 moves upward, and then the hooked claws 42 are inserted into the vertical fitting hole 52. The retaining piece 54 is coupled to the extension 41 in the enclosed lower space of the C-shaped flange 51 in such a manner that the hooked claws 42 inserted into the fitting recess 55 are hooked on a bottom surface of the retaining piece 54, that the fitted nose 56 of the retaining piece 54 is inserted into the horizontal fitting hole 53, and that the opposite support protrusions 57 protrude upwardly on opposite sides of the C-shaped flange 51. The annular coil spring 58 is supported in the recesses of the C-shaped flange 51 and the retaining piece 54. As such, the installation of the pipe is very complicated, and the pipe should be installed while being supported, so that it cannot be readily installed. Further, because it takes much time to install the pipe, working efficiency is lowered. Because the retaining piece 54 and the annular coil spring 58 are discrete components, at least one of them may be lost, which would make it impossible to install the pipe.

Besides, these conventional pipe hangers 1-4 and 1-5 are constructed such that the nut blocks 13 and 44, which are coupled to the upper surfaces of the supporting bracket 10 and the upper band 40 respectively, rotate freely. Hence, the pipe hanger vibrates and is rotated by external impacts, so that the supporting rod is gradually unfastened from the nut block, thereby being reduced in its ability to fully support the pipe.

Further, at upper and lower ends of a hollow body 13-1, on an upper surface of which the nut block 13 mounted at the upper surface of the supporting bracket 10 is inserted, flanges 13-3 and 13-4 are integrally formed inside and outside the upper surface and retained at the upper surface. Hence, when being subjected to vibration due to external impacts or earthquakes, the pipe hanger does not dampen (prevent) the vibration. As a result, there occurs deformation between the supporting rod 60 and the supporting bracket 10 supporting the weight of the pipe. Furthermore, when such vibration is strong, the pipe is twisted or separated from the pipe hanger.

SUMMARY OF THE INVENTION

Accordingly, the present invention has been made keeping in mind the above problems occurring in the prior art, and an object of the present invention is to provide a pipe hanger, which is further improved over a conventional piper hanger.

Another object of the present invention is to provide a pipe hanger, which hooks or unhooks lower ends of semicircular bands divided left and right by means of a hooking means, mounts mounting plates integrally formed at the lower end of a supporting bracket to mounting plates integrally formed at upper ends of the semicircular bands, provides a resiliently biasing means in the supporting bracket to resiliently bias the nut block in an upward direction, couples a locking plate or rod into the mounting plates of the other-side semicircular band and the supporting bracket, mounts a locking assembly to the mounting plate of the one-side semicircular band, and forms a hook of the lower end of the other-side semicircular band so as to extend beyond the vertical center line of a inner space defined by the semicircular bands.

Yet another object of the present invention is to provide a pipe hanger, capable of preventing swaying caused by external impacts and unfastening of a supporting rod fixed to a ceiling by providing a resiliently biasing means in a supporting bracket to retain a nut block, readily installing a pipe while readily locking and unlocking a locking plate or rod, which is coupled into the mounting plates of a one-side semicircular band and the supporting bracket, to and from a locking assembly mounted to the mounting plate of the other-side semicircular band, and supporting the pipe seated by a hook of the one-side semicircular band which is formed to extend beyond a vertical center line to thereby prevent the seated pipe from falling down as well as to readily mount the other-side semicircular band.

In order to achieve the above objects, the present invention provides a pipe hanger (1, 1-1 or 1-2), which includes bisected semicircular bands (2 and 3) that are coupled and decoupled to support and separate a pipe, that a hooked claw (9) and a hooking hole (6) are formed at lower ends thereof respectively, and that mounting plates (4 and 5) are integrally formed at upper ends thereof, and with a supporting bracket (10) that has mounting plates (11) coupled to the mounting plates (4 and 5) of the semicircular bands (2 and 3), and that a nut block (13) protrudes through an upper surface thereof, comprises:

a pad (14) coupled to inner surfaces of the semicircular bands (2 and 3), and contacting the supported pipe to damp vibration from the pipe;

a shock absorber (15) installed in the supporting bracket (10), and resiliently biasing and retaining the nut block (13); and a locking assembly (20) locked to and unlocked from a locking plate (30), which is press-fitted into mounting holes (4-1 and 11-1) bored through the mounting plates (4 and 11) of the one-side semicircular band (2) and the supporting bracket (10), and mounted to the mounting plate (5) of the other-side semicircular band (3).

Here, the hook (7) of the lower end of the one-side semicircular band (2) may be formed so as to extend beyond a vertical center line up to a side opposite thereto by means of a seat (8) bent to form a recess (8-1).

BRIEF DESCRIPTION OF THE DRAWINGS

The above and other objects, features and other advantages of the present invention will be more clearly understood from the following detailed description when taken in conjunction with the accompanying drawings, in which:

FIG. 1 is an exploded perspective view illustrating a pipe hanger according to the present invention;

FIG. 2 is an assembled sectional view illustrating a pipe hanger according to the present invention;

FIGS. 3A and 3B are views for explaining operation of a locking assembly in a pipe hanger according to the present invention;

FIGS. 4A and, 4B and 4C are an exploded perspective view, and views for explaining operation, of a pipe hanger according to another embodiment of the present invention;

FIGS. 5A and, 5B and 5C are an exploded perspective view, and views for explaining operation, of a pipe hanger according to yet another embodiment of the present invention; and FIGS. 6 and 7 are exploded perspective views illustrating conventional different pipe hangers.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

FIGS. 1, 2, 3A, 3B, 4A to 4C, and 5A to 5C illustrate embodiments of a pipe hanger 1 according to the present invention. More Specifically, FIGS. 1, 2, and 3A ant 3B are an exploded perspective view, an assembled sectional view, and views for explaining operation, of a pipe hanger 1 according to the present invention. FIGS. 4A and 5A and, 4B and 4C and 5B and 5C are exploded perspective views, and views for explaining operation, of different pipe hangers 1-1 and 1-2 according to the present invention.

Referring to FIGS. 1, 2, 3A and 3B, the pipe hanger 1 according to the present invention is constructed as follows.

A pair of semicircular bands 2 and 3 is formed so as to be be decoupled from each other. The semicircular bands 2 and 3 are integrally formed with mounting plates 4 and 5, through which mounting holes 4-1 and 5-1 are vertically bored, on upper ends thereof, respectively. The semicircular bands 2 and 3 are formed with a hook 7 and a hooking hole 6, which have a T shape, so as to be hooked and unhooked on lower ends thereof, respectively.

The hook 7 provided to the semicircular band 2 is integrally formed with a seat 8, which is bent to form a recess 8-1 opened on an upper side thereof, and a typical hooked claw 9, which is located at an outer end of the seat 8. In order to hook and unhook the hooked claw 9 into and from the hooking hole 6, the hooking hole 6 is provided with a neck, into which the recess 8-1 is hooked. Thereby, the lower end 3-2 of the semicircular band 3 is located on an outer surface of the lower end of the other semicircular band 2, and the hooked claw 9 is located on an inner surface of the lower end of the semicircular band 3.

A pad 14 formed of a rubber or a sort synthetic resin is disposed in an inner space defined by the semicircular bands 2 and 3 coupled as described above so as to surround a pipe. Thereby, it is possible to reliably clamp the pipe and obtain a damping effect.

The semicircular hand 2 or 3 is provided with one or more clamping holes 2-1 or 3-1, and the pad 14 is provided with clamped knobs 14-1, which corresponds to the clamping holes 2-1 and 3-1, on an outer surface thereof. The clamped knobs 14-1 are inserted into the clamping holes 2-1 and 3-1 from the inside to the outside. The clamped knobs 14-1 protruding outside the clamping holes 2-1 and 3-1 are thermal-bonded so as not to escape from the clamping holes 2-1 and 3-1, as illustrated in FIG. 2.

A supporting bracket 10, which has a rectangular shape and opposite longitudinal edges of which are bent and contacted to each other, is mounted by a nut block 13, which protrudes through an upper surface of the supporting bracket 10 so as to be screwed onto the lower end of a supporting rod 60. A pair of mounting plates 11, which are formed by bending and contacting the opposite longitudinal edges of the supporting bracket 10, have elongate mounting holes 11-1, which vertically extend and communicate with each other.

This construction is the same as in the conventional pipe hanger 1-3, except that the seat 8 is integrally formed with the hooked claw 9 and that the mounting holes 4-1 and 5-1, and 11-1 are vertically and elongatedly bored, and so its detailed description will be omitted.

The supporting bracket 10 has a shock absorber 15 installed therein, thereby resiliently biasing the nut block 13, which protrudes through the upper surface of the supporting bracket 10, in a upward direction so as to be able to obtain a damping effect.

The shock absorber 15 is adapted to dispose a coil spring 16 between a lower end of the nut block 13, which protrudes from the inside to the outside of she supporting bracket 10 at the center of the upper surface of the supporting bracket 10, and an inner bottom surface of the supporting bracket 10, thereby resiliently biasing the nut block 13 in a upward direction.

Especially, the nut block 13 is adapted Lo integrally form a flange 13-3 on the lower end of a hollow body 13-1, on an inner lower surface of which a threaded section 13-2 is formed, thereby allowing the hollow body 13-1 to protrude from the inside to the outside of the supporting bracket 10 at the center of the upper surface of the supporting bracket 10. The coil spring 16 is integrally formed with a large-diameter seating spring 17 on an upper side thereof and a small-diameter bearing spring 18 on a lower side thereof. The flange 13-3 of the nut block 13 is inserted (fitted) into the large-diameter seating spring 17, thereby being seated on the small-diameter bearing spring 18.

The mounting plates 4 and 5 of the semicircular bands 2 and 3, and the mounting plates 11 of the supporting bracket 10 are coupled by a locking assembly 20, which is constructed as follows.

Any one of the mounting plates 11 of the supporting bracket 10 is brought into contact with an inner surface of the mounting plate 4 formed at the upper end of the semicircular band 2. A locking plate 30, which has a locking hole 31 bored at a leading end thereof, is press-fitted into the mounting holes 4-1 and 11-1, which communicate with each other, so as not to be separated from each other. Here, the locking plate 30 has stoppers 32 formed at opposite corners of the trailing end thereof so as to be stopped on an outer surface of the mounting plate 4, and slanted surfaces 33 formed as opposite corners of the leading end thereof so as to be easily inserted into the mounting holes 4-1, 5-1 and 11-1 of the mounting plates 4, 5 and 11.

A locking cap 21 is formed with an inner recess 21-1 opened to the mounting plate 5, an elongate locking hole 22 vertically bored in the middle thereof so as to allow the leading end of the locking plate 30 to be inserted, retaining noses 24 protruding on opposite sides thereof and inwardly bent at the rear of the mounting plate 5 in contact with the mounting plate 5 so as to integrally mount the locking cap 21 to the, mounting plate 5, and a cutout 23 formed at a lower end of one side thereof.

The recess 21-1 of the locking cap 21 is provided with a resiliently biasing means, i.e. a leaf spring 29 and a coil spring (not shown in detail), for resiliently biasing a locking guide 25 toward the cutout 23. The locking guide 25 has an operation plate 26 having a short lock pin 26-2, and a long pusher 26-1 formed at the lower end thereof. The pusher 26-1 is formed with a stopper 26-3, which is near a leading end of the pusher 26-1 and is spaced apart from and parallel to the operation plate 26 so as to restrict forward movement. The leading end of the long pusher 26-1 is exposed to the outside through the cutout 23.

FIGS. 4A to 4C illustrate a pipe hanger 1-1 according to another embodiment of the present invention. The pipe hanger 1-1 is identical to the pipe hanger 1 illustrated in FIGS. 1 to 3B, excluding a locking assembly 20-1 installed to the upper side of the semicircular bands 2 and 3.

The locking assembly 20-1 of the pipe hanger 1-1 is constructed as follows.

Any one of the mounting plates 11 of the supporting bracket 10 is brought into contact with the inner surface of the mounting plate 4 formed at the upper end of the semicircular hand 2. A locking plate 30, which has locking slits 34 punched en upper and lower sides of a leading end thereof, is press-fitted into the mounting holes 4-1 and 11-1, which communicate with each other, so as not to be separated from each other.

Here, the locking plate 30 has stoppers 32 formed at opposite corners of the trailing end thereof so as to be stopped on the outer surface of the mounting plate 4, locking slits 34 punched on upper and lower sides of a leading end thereof, and slanted surfaces 33 formed at opposite corners of the leading end thereof so as to be easily inserted into the mounting holes 4-1, 5-1 and 11-1 of the mounting plates 4, 5 and 11.

A locking cap 21 is formed with an inner recess 21-1 opened to the mounting plate 5, an elongate locking hole 22 vertically bored in the middle thereof so as to allow the leading end of the locking plate 30 to be inserted, retaining noses 21-2 protruding on opposite sides thereof and inwardly bent at the rear of the mounting plate 5 in contact with the mounting plate 5 so as to integrally mount the locking cap 21 to the mounting plate 5, and a cutout 23 formed at a lower end of one side thereof.

A locking guide 25 is formed with a locking-unlocking hole 27-3, which has a wide unlocking hole 27-5 and a narrow locking hole 27-4 integrally formed within an operation plate 27. A lower end of the operation plate 27 which is adjacent to the unlocking hole 27-5 is integrally formed with a long pusher 27-2, a leading end of which is exposed to the outside through the cutout 23.

The recess 21-1 of the locking cap 21 is provided with a resiliently biasing means, i.e. a leaf spring 29 and a coil spring (not shown in detail), for resiliently biasing the locking guide 25 toward the cutout 23.

FIGS. 5A to 5C illustrate a pipe hanger 1-2 according to yet another embodiment of the present invention. The pipe hanger 1-2 is identical to the pipe hanger 1 illustrated in FIGS.

1 to 3B, excluding a locking assembly 20-2 installed to the upper side of the semicircular bands 2 and 3 and its related components.

The locking assembly 20-2 of the pipe hanger 1-2 is constructed as follows.

Any one of the mounting plates 11 of the supporting bracket 10 is brought into contact with the inner surface of the mounting plate 4 formed at the upper end of the semicircular band 2. A locking rod 35 is press-fitted into the mounting holes 4-1 and 11-1, which communicate with each other, so as not to be separated from each other.

Here, the locking rod 35 is formed with a locking slit 35-2 at a leading end thereof, and a flange 35-1 at a trailing end thereof so as to be stopped on the outer surface of the mounting plate 4.

A locking cap 21 is formed with an inner recess 21-1 opened to the mounting plate 5, a locking hole 22 bored in the middle thereof, retaining noses 24 protruding on opposite sides thereof and inwardly bent at the rear of the mounting plate 5, and a cutout 23 formed at a lower end of one side thereof.

A locking guide 25, which is installed in the locking cap 21, has a punched through-hole 28-2 within an operation plate 28. A lower end of the operation plate 28 is integrally formed with a long pusher 28-1, a leading end of which is exposed to the outside through the cutout 23 of the locking cap 21.

The recess 21-1 of the locking cap 21 is provided with a resiliently biasing means, thereby resiliently biasing the locking guide 25 toward the cutout 23.

Hereinafter, a use state of the pipe hanger 1, 1-1 or 1-2 according to the present invention, i.e. a process of installing the pipe, will be described.

In the state where the locking assembly 20, 20-1 or 20-2 mounted at the upper side of the semicircular band 3 is locked or unlocked onto or from the locking plate 30, the nut block 13 is screwed onto the lower end of the supporting rod 60, which is fixed onto an installation plane such as a ceiling, thereby mounting the pipe hanger 1. When the pipe hanger 1 is mounted to the supporting rod 60, the coil spring 16 installed in the supporting bracket 10 pushes upward and retains the nut block 13. Hence, although external impacts are applied to the pipe hanger 1, the supporting bracket 10 absorbs the impacts, thereby maintaining a stable state without fluctuation.

When the pusher 26-1, 27-2, 28-1 of the locking assembly 20, 20-1 or 20-2 is pressed in the pipe hanger mounted at the lower end of the supporting rod 60, the locking guide 25 moves back against the leaf spring 29.

When the operation plate 26, 27, 28 of the locking guide 25 moves backward against the leaf spring 29, the locking assembly 20 as illustrated in FIGS. 1 to 3B is unlocked in such a manner that the short lock pin 26-2 of the locking guide 25 moves backward to escape from the locking hole 31 of the locking plate 30. Further, the locking assembly 20-1 as illustrated in FIGS. 4A to 4C is unlocked in such a manner that the locking hole 27-4 escapes (moves backward) from the locking slits 34 until the unlocking hole 27-5 reaches the locking slits 34. Finally, the locking assembly 20-2 as illustrated in FIGS. 5A to 5C is unlocked in such a manner that the locking face 28-3 inserted in the locking slit 35-2 of the locking rod 35 escapes from the locking slit 35-2 and then reaches the center of the punched through-hole 28-2.

As described above, when the locking assembly 20, 20-1 or 20-2 is unlocked, the semicircular band 3 is turned outwards and thus opens the inner space shared with the semicircular band 2.

In the state where the semicircular bands 2 and 3 are opened, when a pipe (not shown) is placed on the stationary semicircular band 2, the pipe maintains a stably seated state without deviation by means of the hook 7, which extends from the lower end of the semicircular hand 2 beyond a vertical center line to overlap with the lower end of the semicircular band 3.

In the state where the pipe is seated on the stationary semicircular band 2, the semicircular band 3 is turned upward, and then the locking guide 25 of the locking assembly 20, 20-1 or 20-2 is pressed. In this state, the leading end of the locking plate 30, which protrudes outside the mounting plates 11 of the supporting bracket 10, is inserted into the mounting hole 5-1 of the mounting plate 5 and the locking hole 22 of the locking cap 21. When pressure transmitted by the pusher 28-1 is released, the locking guide 25 moves forward by means of resilient force of the leaf spring 29.

In the case of the locking assembly 20 of the pipe hanger 1 illustrated in FIGS. 1 to 3B, when the locking guide 25 mounted in the locking cap 21 moves forward by means of resilient force of the leaf spring 29, the short lock pin 26-2 moves forward. Thereby, the lock pin 26-2 is inserted into the locking hole 31 of the locking plate 30 located in the recess 21-1, thereby locking the locking assembly 20 onto the locking plate 30. When the locking assembly 20 is locked onto the locking plate 30, the pipe is retained and installed by the pad 14 for the semicircular bands 2 and 3.

In the case of the locking assembly 20-1 of the pipe hanger 1-1 illustrated in FIGS. 4A to 4C, when the locking guide 25 mounted in the locking cap 21 moves forward by means of resilient force of the leaf spring 29, the operation plate 27 of the locking guide 25 moves forward. Thereby, the operation plate 27 located in the recess 21-1 is inserted into the locking slits 34 of the locking plate 30 through its locking hole 27-4 communicating with its unlocking hole 27-5, thereby locking the operation plate 27 onto the locking plate 30. When the operation plate 27 is locked onto the locking plate 30, the pipe is retained and installed by the pad 14 for the semicircular bands 2 and 3.

In the case of the locking assembly 20-2 of the pipe hanger 1-2 illustrated in FIGS. 5A to 5C, when the locking guide 25 mounted in the locking cap 21 moves forward by means of resilient force of the leaf spring 29, the operation plate 28 of the locking guide 25 moves forward. Thereby, the locking face 28-3 of the operation plate 28 is coupled (inserted) into the locking slit 35-2 of the locking rod 35. When the locking face 28-3 of the operation plate 28 is locked into the locking slit 35-2 of the locking rod 35, the pipe is retained and installed by the pad 14 for the semicircular bands 2 and 3.

On the other hand, when the pipe is separated from the pipe hanger by unlocking the locking assembly 20, 20-1 or 20-2 locked as described above, the locking assembly 20 is unlocked in such a manner that the pusher 26-1 of the locking assembly 20 is pressed to cause the short lock pin 26-2 to escape (be unlocked) from the locking hole 31 of the locking plate 30 (embodiment of FIGS. 1 to 3B). Further, the locking assembly 20-1 is unlocked in such a manner that the locking hole 27-4 located in the locking slits 34 escapes from the locking slits 34 up to the unlocking hole 27-5 (embodiment of FIGS. 4A to 4C). Finally, the locking assembly 20-2 is unlocked in such a manner that the locking face 28-3 escapes from the locking slit 35-2 (embodiment of FIGS. 5A to 5C). In the escaping (unlocked) state as described above, the semicircular band 3 is turned outside together with the locking assembly, and then the pipe seated on the semicircular band 2 can be separated (withdrawn) from the semicircular band 2.

In this manner, the pipe hanger 1 according to the present invention can readily install or separate the pipe by locking or unlocking the locking guide 25 mounted to the mounting plate 5 of the semicircular band 3 onto or from the locking hole 31 (FIGS. 1 to 3B) or the locking slits 34 (FIGS. 4A to 4C) of the locking plate 30, or the locking slit 35-2 of the locking rod 35 (FIGS. 5A to 5C) inserted in both the mounting plate 4 of the semicircular band 2 and the mounting plates 11 of the supporting bracket 10.

As can be seen from the foregoing, the pipe hanger according to the present invention hooks or unhooks the lower ends of the semicircular bands divided left and right by means of the hooking means, mounts the mounting plates integrally formed at the lower end of the supporting bracket to the mounting plates integrally formed at the upper ends of the semicircular bands, provides the resiliently biasing means in the supporting bracket to resiliently bias the nut block in an upward direction, couples the locking plate or rod into the mounting plates of the other-side semicircular band and the supporting bracket, mounts the locking cap and the locking guide to the mounting plate of the one-side semicircular band, and forms the hook of the lower end of the other-side semicircular band so as to extend beyond the vertical center line of the inner space defined by the semicircular bands. In this manner, the resiliently biasing means is provided in she supporting bracket to thereby retain the nut block, so that it is possible to prevent the supporting rod fixed to the ceiling of the building from being unfastened while the supporting rod is prevented from swaying by external impacts. The locking plate or rod coupled into the mounting plates of the other-side semicircular band and the supporting bracket is easily locked to or unlocked from the locking guide mounted to the mounting plate of the one-side semicircular band, so chat the pipe is readily installed. The pipe seated by the hook of the other-side semicircular band which extends beyond the vertical center line of the inner space defined by the semicircular bands is supported, so that the one-side semicircular band can be readily mounted while preventing the seated pipe from falling down.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pipe hanger provided with bisected semicircular bands that are coupled and decoupled to support and separate a pipe, that a hooked claw and a hooking hole are formed at lower ends thereof respectively, and that mounting plates are integrally formed at upper ends thereof, and with a supporting bracket that has mounting plates coupled to the mounting plates of the semicircular bands, and that a nut block protrudes through an upper surface thereof, the pipe hanger comprising:

a pad coupled to inner surfaces of the semicircular bands, and contacting the supported pipe to dampen vibration from the pipe;

a shock absorber installed in the supporting bracket, and resiliently biasing and retaining the nut block; and a locking assembly locked to and unlocked from a locking plate, which is press-fitted into mounting holes bored through the mounting plates of the one-side semicircular band and the supporting bracket, and mounted to the mounting plate of the other-side semicircular band, wherein the hooked claw of the lower end of the one-side semicircular band is formed so as to extend beyond a vertical center line up to a side opposite thereto by means of a seat bent to form a recess, wherein the locking assembly includes:

the locking plate having a locking hole at a leading end thereof, slanted surfaces formed at opposite corners of the leading end thereof so as to be inserted into and withdrawn from the mounting holes of the mounting plates, and stoppers formed at opposite corners of a trailing end thereof so as to be stopped on an outer surface of the mounting plate;

a locking cap formed with an inner recess opened to the mounting plate, an elongate locking hole vertically bored in the middle thereof, retaining noses protruding on opposite sides thereof and inwardly bent at the rear of the mounting plate, and a cutout formed at a lower end of one side thereof;

a locking guide integrally formed with an operation plate having a short lock pin, and a long pusher formed at the lower end thereof, having a stopper formed near a leading end of the pusher and spaced apart parallel to the operation plate so as to restrict forward movement, and having the leading end of the long pusher located in the recess of the locking cap so as to be exposed to the outside through the cutout; and a resiliently biasing means provided in the recess and resiliently biasing a locking guide toward the cutout.

2. The pipe hanger according to claim 1, wherein the resiliently biasing means provided in the recess and resiliently biasing a locking guide toward the cutout is any one of a leaf spring and a coil spring.

3. The pipe hanger according to claim 1, wherein the shock absorber installed in the supporting bracket includes:

the nut block protruding outwardly through the center of the upper surface of the supporting bracket and formed with only a flange at a lower end of a hollow body; and a damping coil spring installed under the nut block and resiliently biasing the nut block in an upward direction.

4. The pipe hanger according to claim 3, wherein the damping coil spring installed under the nut block in the shock absorber is integrally formed with a large-diameter seating spring on an upper side thereof and a small-diameter bearing spring on a lower side thereof, and inserts the flange of the nut block into the large-diameter seating spring so as to be seated on the small-diameter bearing spring.

* * * * *